United States Patent
Brunsch

(10) Patent No.: US 10,781,873 B2
(45) Date of Patent: Sep. 22, 2020

(54) BRAKE SHOE

(71) Applicant: SAF-HOLLAND GmbH, Bessenbach (DE)

(72) Inventor: Bernd Brunsch, Dreieich (DE)

(73) Assignee: SAF-HOLLAND GmbH, Bessenbach (DE)

(*) Notice: Subject to any disclaimer, the term of this patent is extended or adjusted under 35 U.S.C. 154(b) by 92 days.

(21) Appl. No.: 15/772,729

(22) PCT Filed: Oct. 31, 2016

(86) PCT No.: PCT/EP2016/076194
§ 371 (c)(1),
(2) Date: May 1, 2018

(87) PCT Pub. No.: WO2017/076790
PCT Pub. Date: May 11, 2017

(65) Prior Publication Data
US 2019/0203787 A1    Jul. 4, 2019

(30) Foreign Application Priority Data
Nov. 3, 2015   (DE) .................. 10 2015 118 783

(51) Int. Cl.
*F16D 65/08*    (2006.01)
*F16D 69/04*    (2006.01)

(52) U.S. Cl.
CPC ......... *F16D 65/08* (2013.01); *F16D 69/0416* (2013.01); *F16D 2069/0433* (2013.01); *F16D 2250/0084* (2013.01)

(58) Field of Classification Search
CPC .... F16D 65/092; F16D 65/08; F16D 69/0408; F16D 69/0416; F16D 2069/0433; F16D 2069/0441; F16D 2250/0084; F16D 69/04; B61H 5/00; F16F 2069/0408
USPC ................ 188/251 R, 250 B, 250 R, 218 XL
See application file for complete search history.

(56) References Cited

U.S. PATENT DOCUMENTS

| | | | |
|---|---|---|---|
| 1,796,433 A * | 3/1931 | Blume ................ | F16D 69/0416 188/240 |
| 1,935,348 A * | 11/1933 | Blume ................ | F16D 69/0416 188/251 R |
| 2,008,169 A | 7/1935 | Blackmore et al. | |
| 3,198,294 A | 8/1965 | Stacy | |

(Continued)

FOREIGN PATENT DOCUMENTS

| BE | 544520 | 2/1956 |
|---|---|---|
| CN | 1177067 | 3/1998 |

(Continued)

OTHER PUBLICATIONS

European Patent Office; International Search Report; dated Jan. 26, 2017.

*Primary Examiner* — Robert A. Siconolfi
*Assistant Examiner* — San M Aung
(74) *Attorney, Agent, or Firm* — Price Heneveld LLP

(57) ABSTRACT

A brake shoe, in particular of a drum brake for utility vehicles, comprising a lining carrier with an arrangement face for arranging a brake lining, a fastening area which is configured to be placed in engagement with a fastening means for fastening the brake lining, wherein the fastening area is embodied so as to be movable in a resettable fashion with respect to the arrangement face.

16 Claims, 4 Drawing Sheets

(56) References Cited

U.S. PATENT DOCUMENTS

| | | | |
|---|---|---|---|
| 3,390,744 A | | 7/1968 | Fawick |
| 4,973,102 A | | 11/1990 | Bien |
| 5,934,418 A | * | 8/1999 | Wirth .................. F16D 65/0006 |
| | | | 188/217 |
| 2005/0173210 A1 | * | 8/2005 | Wirth ...................... F16D 69/04 |
| | | | 188/250 R |
| 2008/0257664 A1 | * | 10/2008 | Holme ................ F16D 69/0408 |
| | | | 188/250 B |
| 2014/0360823 A1 | * | 12/2014 | De Soccio ............ F16D 65/092 |
| | | | 188/250 G |

FOREIGN PATENT DOCUMENTS

| | | | | |
|---|---|---|---|---|
| CN | 201875026 | | 6/2011 | |
| CN | 203670559 | | 6/2014 | |
| CN | 104093581 | | 10/2014 | |
| DE | 1739292 | | 7/1957 | |
| DE | 1575774 | | 1/1971 | |
| DE | 2112064 | | 9/1971 | |
| DE | 202013101402 | | 8/2014 | |
| EP | 1270982 | | 1/2003 | |
| EP | 1318321 A1 | * | 6/2003 | ........... F16D 65/092 |
| EP | 1318321 | | 11/2003 | |
| EP | 2023000 A1 | * | 2/2009 | |
| FR | 2666632 | | 3/1992 | |
| GB | 2119462 | | 11/1983 | |
| WO | 03098068 | | 11/2003 | |
| WO | 2015019380 | | 2/2015 | |

\* cited by examiner

BRAKE SHOE

BACKGROUND OF THE INVENTION

The present invention relates to a brake shoe, in particular of a drum brake for utility vehicles, and to a method for producing a rivet connection.

Brake linings are often riveted. For example stroke-controlled riveting machines are used. It is also known to use force-controlled riveting machines which constitute an improvement in terms of the fact that differences in thickness of the components involved can be compensated, as a result of which a uniform initial load of the rivet, for example on the brake lining, is always ensured. When components are fastened with respect to one another or to one another generally or with the known riveting methods, there is basically the disadvantage that a change in the thickness of the components during operation, for example as a result of setting owing to thermal loading, cannot be compensated, with the result that an initial load which is set at the beginning is, under certain circumstances, lost and therefore a permanent connection is no longer ensured. This is problematic, in particular when fastening brake linings, since they are subject to particularly high thermal loads.

An object of the present invention is therefore to specify a brake shoe and a method for producing a rivet connection which permits a uniform initial load to be maintained even during operation.

SUMMARY OF THE INVENTION

According to the invention, a brake shoe, in particular of a drum brake for utility vehicles, comprises a lining carrier with an arrangement face for arranging a brake lining, and a fastening area which is configured to be placed in engagement with a fastening means for fastening the brake lining, wherein the fastening area is embodied so as to be movable in a resettable fashion with respect to the arrangement face. The brake shoe is preferably a brake shoe of a drum brake, in particular for utility vehicles. However, it can also be a brake shoe for disc brakes. Both have corresponding lining carriers or lining carrier areas with corresponding arrangement faces for the arrangement and fastening of the brake lining, wherein the essential difference is that in disc brakes the lining carrier is embodied in a flat or level fashion, while in drum brakes the lining carrier is embodied in a curved fashion or in the form of a lateral surface of a cylinder. The fastening means or fastening element which has corresponding end sections at its ends is preferably a rivet element or a rivet, wherein the type of rivet used is not decisive. The end sections of the rivet element are referred to as a closing head and setting head. If the fastening element is, for example, a screw with an associated nut, the end sections are formed by the screw head and the corresponding nut etc. The introduction of force of the fastening means into the lining carrier and the brake lining in order to connect/fasten them to one another occurs via the end sections. A prestressing force or initial load is therefore applied in order to fasten the brake lining to the lining carrier. The fastening area correspondingly has an opening or bore hole for the arrangement of the fastening means, wherein a diameter is, for example, in a range of approximately 3-10 mm, and preferably of approximately 5-8 mm. Openings/bore holes are present in a congruent fashion with respect to the latter in the brake lining. In the text which follows, reference will mainly be made to the rivet connection or the use of a rivet element, without restricting the general applicability. The brake lining which can be, for example, an organic brake lining, can set, in particular as a result of the thermal loading during braking, which means that a reduction in thickness (of the brake lining) can occur, leading to a situation in which an initial load of the rivet connection, which is found, for example, in the vicinity of 300 daN, is reduced. The fastening area is therefore advantageously designed to be movable in a resettable fashion with respect to the arrangement face. This makes it possible for a reduced overall thickness which is measured, as it were, between the two end sections of the fastening means, to be compensated, in particular since a restoring force is present as a result of the movement, which restoring force is configured to reset the fastening area, wherein said resetting is directed away from the brake lining. In any (rivet) connection it can or will be the case that at least one of the bodies/elements to be connected deforms elastically or even plastically in the region of the introduction of force by a fastening means, such as a rivet, at least in the microscopic range. Such deformation or even movement is, however, not suitable to maintain the above described effect, specifically maintaining a uniform initial load of the rivet connection during operation. What is decisive is that the fastening area is embodied, as such or in its entirety, and not only an infinitesimally small surface area, so as to be movable in a resettable fashion with respect to the arrangement face. The connection is not restricted to the fact that the brake lining is arranged directly on the lining carrier or the arrangement face thereof. If, a further element, for example an intermediate layer, which can also set, is arranged, for example, between the brake lining and the lining carrier, the fastening area also performs its function.

According to one embodiment, the fastening area has an offset with respect to the lining carrier, in particular the arrangement face thereof. For this purpose, the fastening area is expediently oriented away from or spaced apart from the arrangement face, and in the case of a brake shoe for a drum brake it is therefore oriented toward its inner side. The offset is brought about by deformation of the lining carrier, for example by bringing about protrusion, as a result of which the fastening area can be shaped. Shaping also makes it possible to move the fastening area, since the offset or the bringing about protrusion is at least partially re-shaped again when the brake lining is fastened, but the elastic component generates a remaining initial load, which can compensate setting.

According to one embodiment, the fastening area is oriented essentially parallel to the lining carrier, in particular to its arrangement face, wherein the offset is in a range from preferably approximately 0.1 to 0.8 mm, particularly preferably from approximately 0.3 to 0.6 mm. The offset is measured here, in particular, with respect to a face of the lining carrier which lies essentially opposite the arrangement face, referred to as the rear side below. This rear side is expediently oriented essentially parallel to the arrangement face, with the result that the lining carrier is embodied essentially in the form of a plate. In the case of a brake shoe for drum brakes, the plate is curved, while for disc brakes it is embodied in a level fashion. The material used in both cases is preferably a metal material, in particular a steel material. Tests have shown that the abovementioned dimensions of the offset have particularly good resetting properties.

According to one embodiment, the brake shoe comprises at least one cutout which forms a web which connects the lining carrier to the fastening area. On the one hand, the web brings about a positioning of the fastening area and, on the other hand, the web makes available the necessary elasticity and resetting capability. The fastening area can, as it were, "be springy" by way of a correspondingly configured web. Furthermore, the web affects the strength of the connection, since the force flux from the fastening element/rivet element to the fastening area and to the lining carrier is made available via the web. According to one embodiment, the web extends over an angle of approximately 2-30°, preferably of approximately 5-20°, with respect to a center of the fastening area. In an analogous fashion to this, a cutout is formed which forms an angle of approximately 330-358°, preferably of approximately 340-355°. In one preferred embodiment, for example two cutouts in the shape of circular segments which lie opposite one another are provided, said cutouts being arranged in an axially symmetrical fashion with respect to one another and correspondingly forming two webs. The cutouts extend here preferably over an angle of approximately 150-170°.

According to one embodiment, the at least one cutout is configured at least partially essentially in the shape of circular segments. The cutout is expediently formed around the fastening area; the cutout forms, as it were, the fastening area and therefore determines its geometry. The fastening area is therefore also expediently embodied for example to be essentially round, in particular circular, oval or elliptical. The cutout or the gap or else breakthrough can also be etched into, formed by laser, punched, milled etc. The at least one cutout or the gap is expediently formed first, and then the movement, in particular the bringing about protrusion, to the desired degree is carried out. With respect to the brake shoe this means that the fastening area is in particular made to protrude inward, that is to say away from the arrangement face on which the brake lining is arranged. In addition to the abovementioned forms, the cutout can also be embodied to be square, rectangular or generally polygonal, at least in certain areas, which then also applies analogously to the fastening area. Since the cutout has the purpose of making available a possibility of movement between the fastening area and the lining carrier, it would be sufficient if the cutout were to be made infinitesimally small. However, it has proven, for example, advantageous for fabrication if the web (or if appropriate also a plurality thereof) is/are formed directly over the width of the cutout/cutouts. In this embodiment, the web width corresponds essentially to a width of the cutout.

According to one embodiment, at least areas of the at least one cutout run essentially parallel to one another. Therefore, it is possible to form a web whose width is (significantly) larger than the width of the cutout. The areas can also run at an angle to one another, that is to say not parallel to one another, and if appropriate also be curved. All that is decisive is that one web (or also a plurality thereof) is/are shaped with the desired length. According to one embodiment, the fastening area has for example a keyhole contour which is preferably punched out and then made to protrude, with the result that the abovementioned offset is generated. One region of the cutout is embodied here in the form of a circular segment, while in another area the cutout runs essentially in parallel. The flexibility and the resetting force of the first section can be controlled very well by means of the length of the web.

The width or else length of the web is greatly dependent on the individual case and, in particular, also on the number of webs and the material thickness of the lining carrier. According to one embodiment, the lining carrier or the brake shoe is formed generally from a steel material, with a thickness of approximately 1 to 5 mm. It has become apparent that an advantageous ratio of a thickness of the fastening area to a width of the (single) web is in a range from approximately 0.05 to 1, preferably from approximately 0.1 to 0.5, and in particular preferably from approximately 0.15 to 0.35. If a plurality of webs are provided, the abovementioned values are to be correspondingly divided by the number of webs. The same could be determined with respect to the length of the web, with the result that a good compromise of resetting capability and strength is possible if a ratio of the thickness of the first section with respect to the length of the web is in a range from 0.05 to 1, preferably from approximately 0.1 to 0.5, and in particular preferably from approximately 0.15 to 0.35. The web length is measured with respect to the opening essentially in the circumferential direction, while the web width is measured approximately radially with respect to the opening. As has already been indicated above, the length of the web can also take the form of corresponding angle information.

According to one embodiment, the fastening area has the opening, wherein a multiplicity of webs are arranged preferably distributed evenly around the circumference of the opening. As a result of the use of a multiplicity of webs it is also possible to provide an ideal compromise between the strength and the elasticity on an individual basis, depending on the application. When two webs are used, they are preferably arranged opposite one another, since in this way the movement capability of the first section can be controlled well. In particular an axially symmetrical arrangement of the webs or of the cutouts is therefore preferred.

According to one embodiment, the at least one web forms an angle with the lining carrier, in particular with its arrangement face, which is preferably between 10° and 50°. This geometry permits a sufficiently high initial load to be made available and ensures that the fastening area has a good movement capability during riveting. According to one embodiment, the fastening area also has the abovementioned angle relative to the lining carrier, that is to say is not oriented parallel to the lining carrier but instead as it were continues the shape of the web. In this case, the offset is measured, as it were, at the point on the fastening area which is oriented furthest away from the lining carrier.

According to one embodiment, the lining carrier has a multiplicity of fastening areas which are arranged, in particular, in a row. In the case of a brake shoe for drum brakes, in particular for utility vehicles, for example two rows of in each case 7-9, for example 8, fastening areas which are preferably arranged at the same distance from one another along the row are expediently provided. The rows are expediently oriented along a friction direction or braking direction in this context.

The invention relates to a method for producing a rivet connection between at least two components, comprising the steps:
  making available a rivet element and making available at least two components, wherein a first component has an arrangement face for arranging a second component;
  shaping, in particular bringing about a protrusion, a fastening area of the first component in such a way that when the second component is fastened on the arrangement face said attachment area is at least partially restored to its original shape by means of the rivet element, wherein the fastening area is configured to be placed in engagement with the rivet element for fastening the second component;
  fastening the two components to the rivet element.

According to one preferred embodiment, the first component is a brake shoe, in particular of a drum brake for utility vehicles, and the second component is a brake lining.

All the advantages and features which have also been mentioned with respect to the brake shoe according to the invention apply analogously and correspondingly to the method, as well as vice-versa.

BRIEF DESCRIPTIONS OF THE DRAWINGS

Further properties and features can be found in the dependent claims, the following description of preferred embodiments, and the appended figures, wherein individual embodiments can be combined with one another to form new embodiments. In the drawings:

DETAILED DESCRIPTION OF THE PREFERRED EMBODIMENTS

Figure 1:
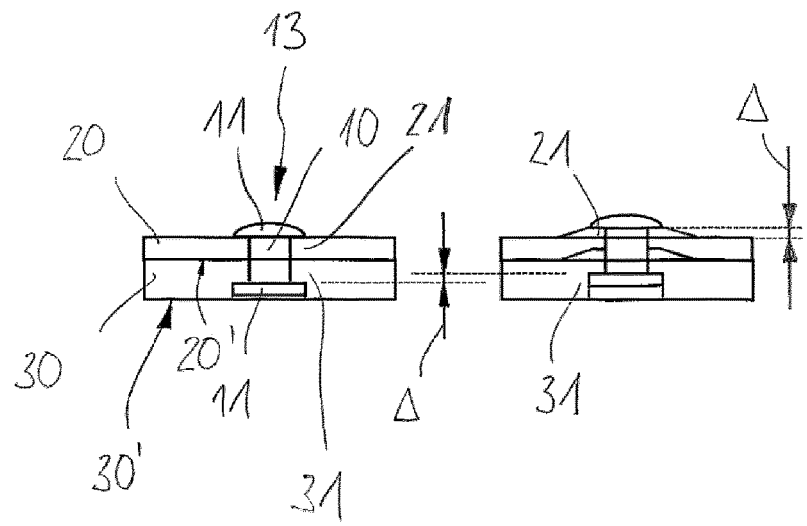
FIG. 1 shows a basic sketch of the principle of action of a brake shoe.

FIG. 1 explains schematically the principle of action of a brake shoe. Illustrated in sketch form are a brake shoe 20 and a brake lining 30, which have fastening areas 21 and 31 which in turn form an opening 13 in which a fastening means 10, such as a rivet element which comprises corresponding end sections 11, is arranged. The lining carrier 20 has an arrangement face 20'. The brake lining 30 has a friction face 30'. For this reason, the fastening section 31 and the part of the opening 13 formed there are embodied in such a way that a corresponding end section 11 of the fastening means 10 is moved with respect to the friction face 30' here. The right-hand half of the diagram shows that the fastening area 21 can compensate a setting Δ by moving away from the friction face 30'. This is made possible by the fact that the fastening area 21 is designed so as to be movable in a resetting fashion with respect to the arrangement face 20'. If the area underneath the end section 11 of the brake lining 30 then yields, as is indicated by the setting Δ (cf. left-hand half of the diagram), this can be compensated by the movement of the fastening area 21 or the resetting capability thereof, as illustrated schematically in the right-hand half of the diagram.

Figure 2A:
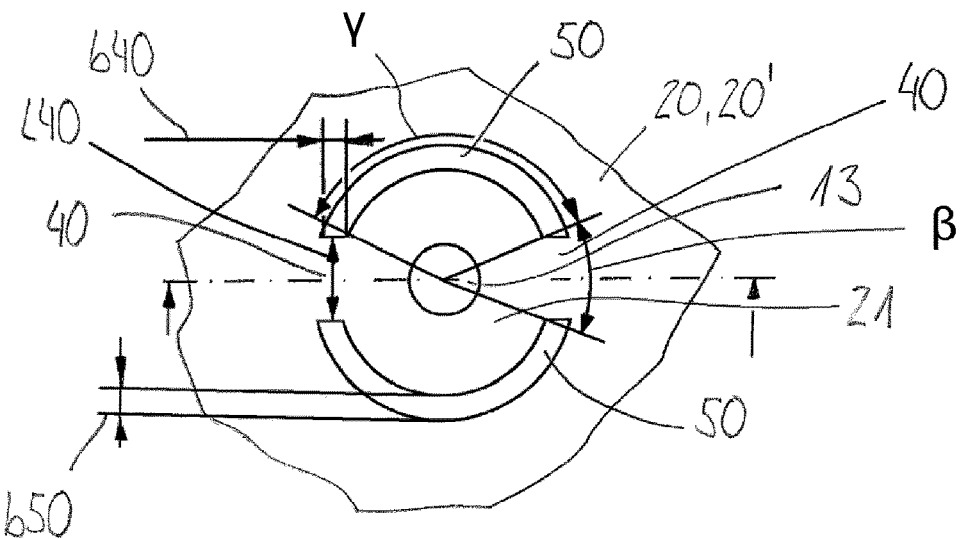
FIGS. 2a-2d show various embodiments of fastening areas.
Figure 2B:
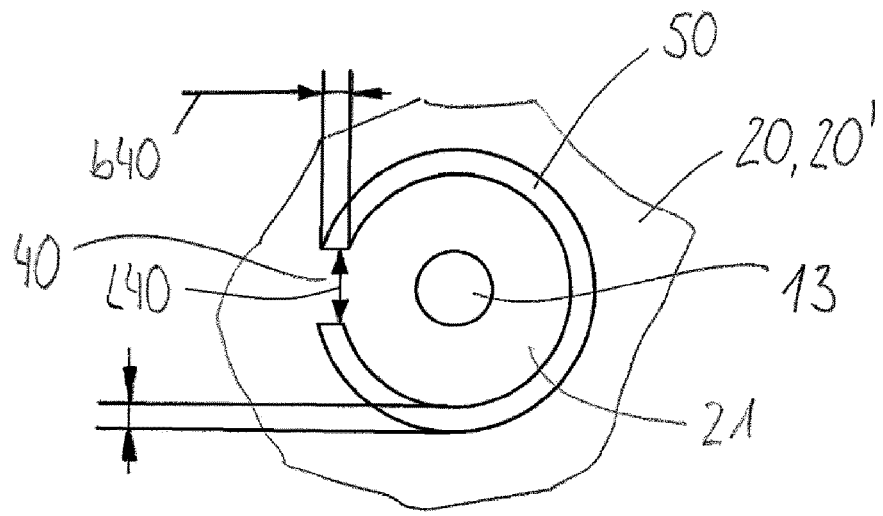
Figure 2C:
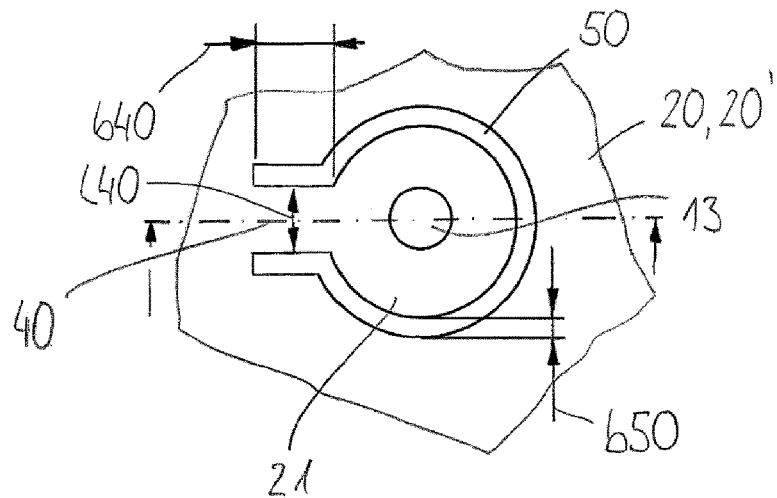
Figure 2D:
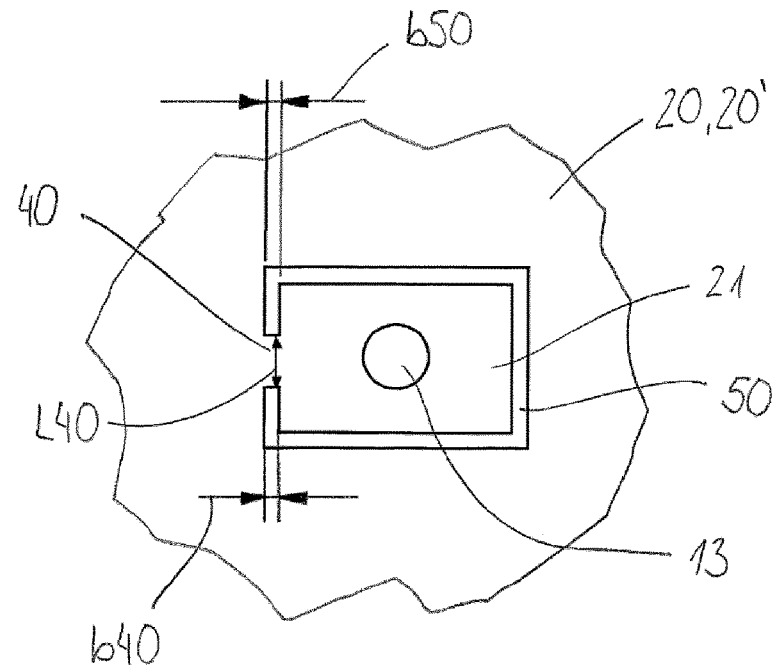

FIGS. 2a to 2d show various embodiments of fastening areas 21 of a lining carrier 20 in a plan view. An opening 13 around which a fastening area 21 is formed can always be seen. Cutouts 50 are formed in the shape of a circular segment or ring in FIGS. 2a to 2c, and essentially in a rectangular shape in FIG. 2d. FIG. 2a shows, in particular, two cutouts 50 which are in the shape of circular segments and are arranged opposite one another or in an axially symmetrical fashion. FIG. 2c shows an embodiment with a cutout 50 which is formed in the shape of a circular segment in one section. In another section, the cutout 50 is shaped in such a way that corresponding areas of the cutout 50 run essentially parallel to one another. A web width b40 is significantly wider here than a width b50 of the cutout 50 or of the gap 50. The elasticity of the fastening area 21 can be adjusted very well by means of the width b40. The same applies with respect to a web length l40. The web length l40 is measured essentially in the circumferential direction with respect to the opening 13, while the web width b40 is measured approximately radially with respect to the opening 13. The dimensioning can also be implemented by means of angle information. With respect to FIG. 2a, for example the angles β and γ are given, which can also be used for the dimensioning. In the embodiment shown here the angle β is for example in a range of approximately 15-25°, while the angle γ is in a range of approximately 140-160°.

Figure 3A:
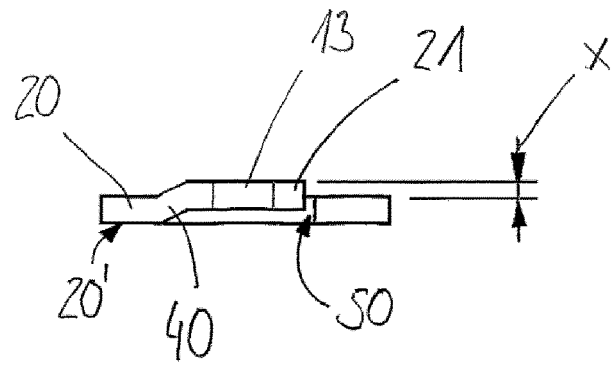
FIGS. 3a and 3b show sectional illustrations of fastening areas.

FIG. 3a shows a section through the embodiment of the lining carrier 20 which is shown in FIG. 2c, along the sectional line characterized there. An offset ×, which the fastening area 21 has with respect to the lining carrier 20, becomes clear here. It is also possible to see the profile of the web 40 and the orientation of the cutout 50 or of the gap 50. In the embodiment shown here, the fastening area 21 is oriented essentially parallel to the lining carrier 20. According to another embodiment (not shown here), it would, however, also be conceivable for the fastening area 21 not to extend parallel to the lining carrier 20 but rather to continue, as it were, the shape or orientation of the web 40. The final orientation of the fastening area 21 then occurs when a brake lining is fastened.

Figure 3B:
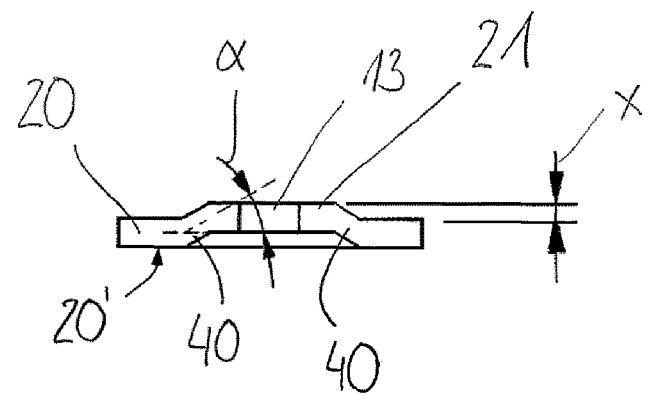

FIG. 3b shows a sectional illustration of the embodiment known from FIG. 2a, wherein two webs 40 can be seen here, in particular, in the side view. An offset × is also included in the sketch. An angle α, which is formed between the web 40 and the lining carrier 20, is also indicated, with preferred values being in a range from approximately 10° to 50° here.

Figure 4:
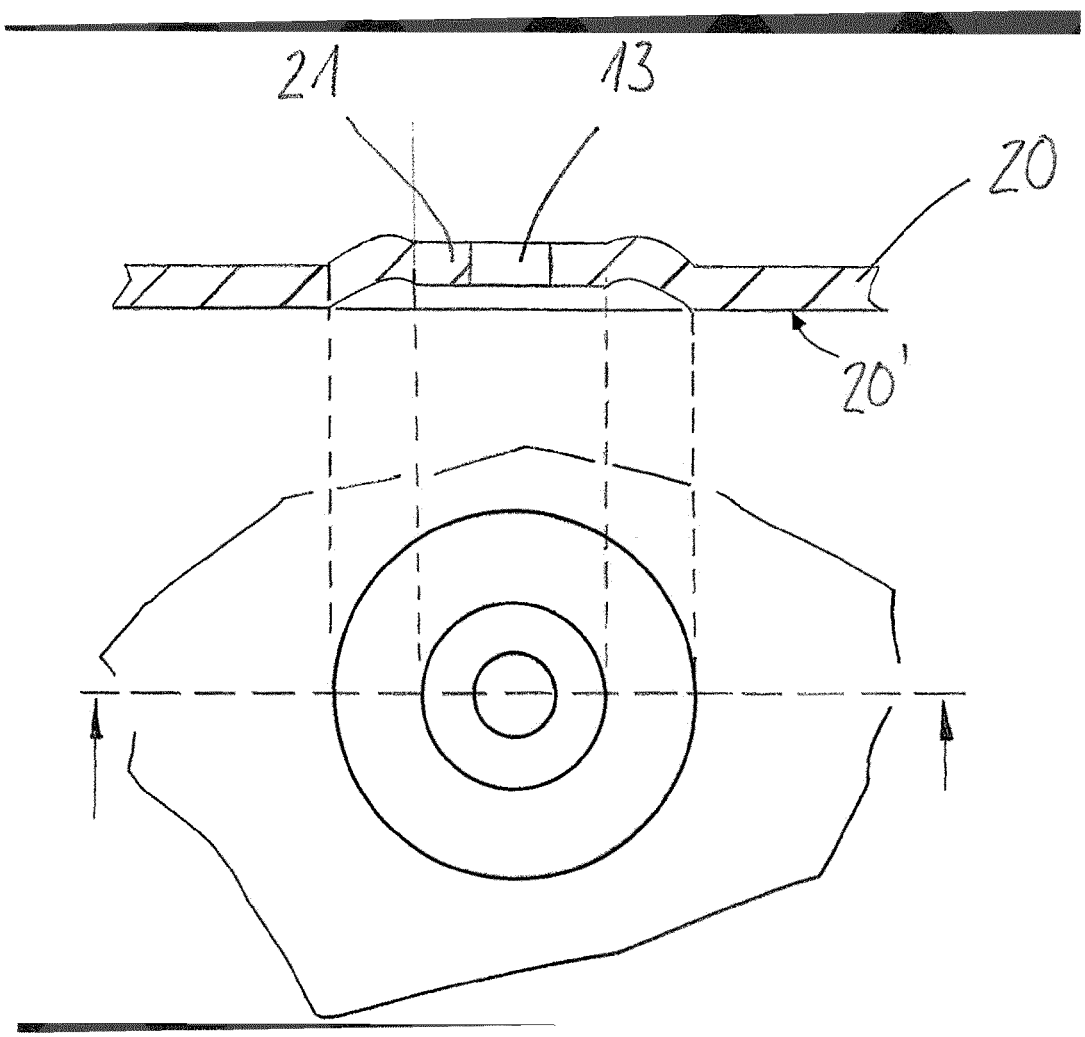
FIG. 4 shows a further embodiment of a fastening area.

FIG. 4 shows an embodiment of a lining carrier 20 which is distinguished here by the fact that an area around a fastening area 21 which comprises the opening 13 is formed without a cutout or a gap etc., with the result that the resetting force which is ultimately to bring about the movement capability of the fastening area 21 is made available solely by the bead-like deformation of the area around the fastening area 21.

Figure 5A:
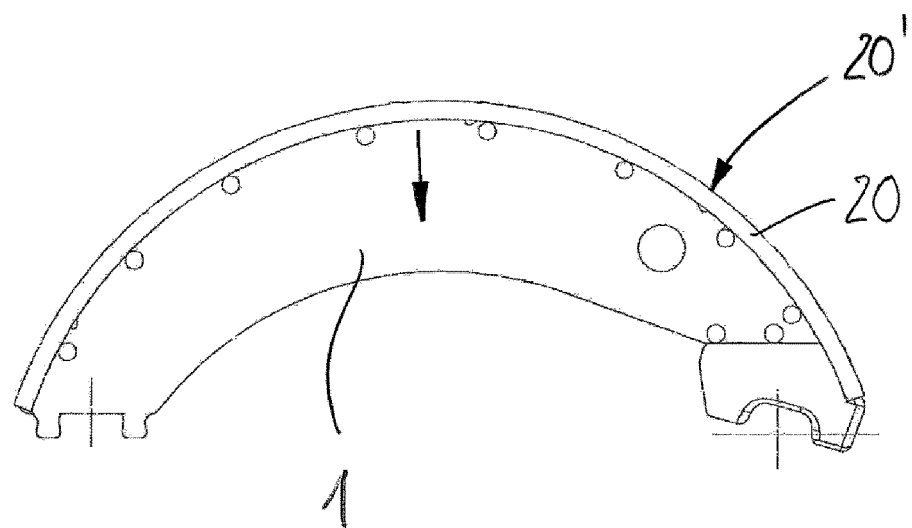
FIGS. 5a and 5b show various views of a brake shoe.

FIG. 5a shows a side view of a brake shoe 1 for a drum brake, which comprises a curved lining carrier 20 with an arrangement face 20' which is designed for the arrangement and fastening of a brake lining (not shown here). The fastening areas which are known from the previous figures are made to protrude or project along the direction of the arrow illustrated here, that is to say away from the arrangement face 20'.

Figure 5B:
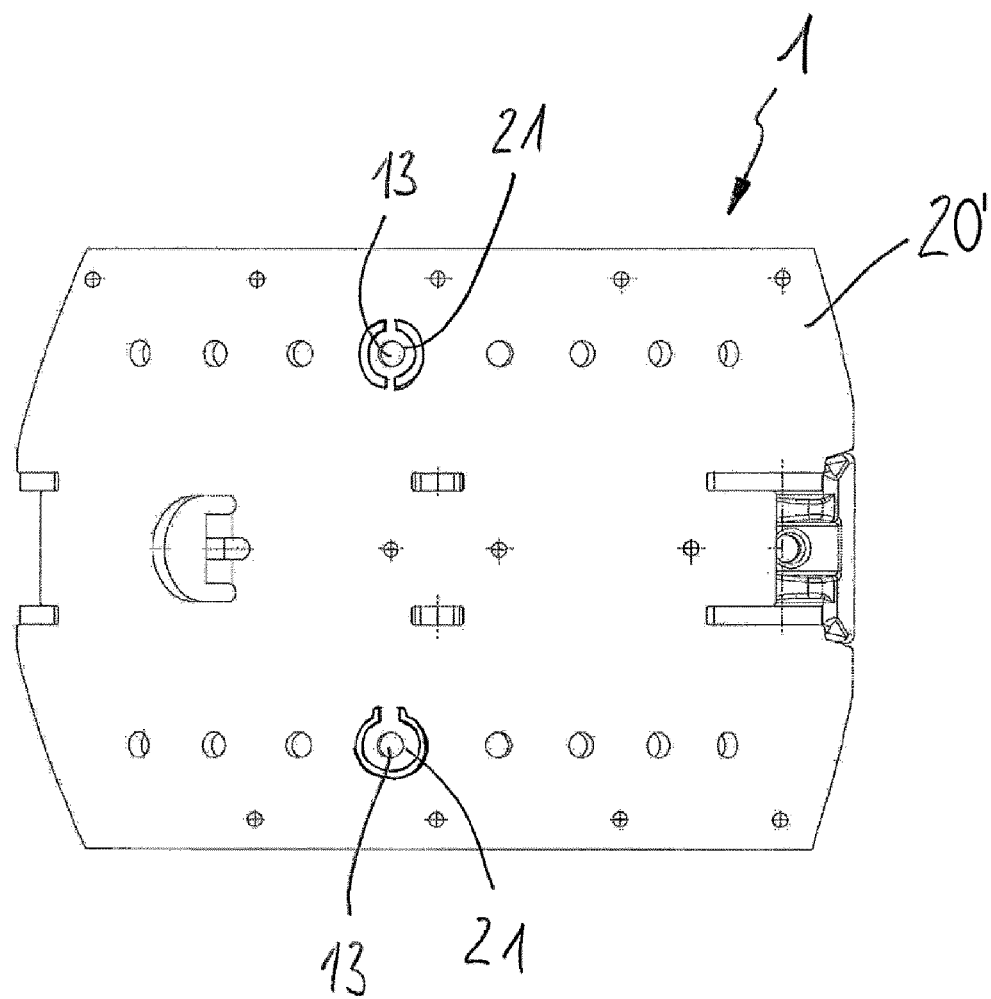

FIG. 5b shows the brake shoe known from FIG. 5a in a folded-down position, that is to say from the outside. The arrangement face 20' can be seen with two rows of openings 13. Two examples of fastening areas 21, as are also known for example from FIGS. 2a and 2c, are indicated merely by way of example. It is apparent that preferably all the openings 13 shown here or the areas around the openings are configured in such a way that permanent and secure fastening of a brake lining is possible.

LIST OF REFERENCE SYMBOLS

1 Brake shoe
10 Fastening means
11 End section
13 Opening
20 Lining carrier
20' Arrangement face
21 Fastening area (of the lining carrier)
30 Brake shoe
30' Friction face
31 Fastening area (of the brake lining)
40 Web
b40 Width of the web
l40 Length of the web 50 Gap/cutout
b50 Width of the gap/cutout
α, β, γ Angle
x Offset
Δ Setting

The invention claimed is:

1. A brake shoe of a drum brake for utility vehicles, comprising:
   a brake lining;
   a fastener;
   a lining carrier with an arrangement face for the arrangement of a brake lining; and
   a fastening area configured to be placed in engagement with the fastener configured to fasten the brake lining to the lining carrier;
   wherein the fastening area is configured to be movable in a resettable fashion with respect to the arrangement face of the lining carrier in a direction away from the brake lining;
   wherein the fastening area has an opening for arranging the fastener;
   wherein the brake lining has openings corresponding to the opening of the fastening area; and
   wherein the fastening area has an offset with respect to the arrangement face of the lining carrier in a direction away from the brake lining.

2. The brake shoe as claimed in claim 1, wherein the fastening area is oriented substantially parallel to the lining carrier, and wherein the offset is within a range from approximately 0.1 to about 0.8 mm.

3. The brake shoe as claimed in claim 1, further comprising:
   at least one cutout which forms a web which connects the lining carrier to the fastening area.

4. The brake shoe as claimed in claim 3, wherein the at least one cutout comprises a circular segment, at least in sections thereof.

5. The brake shoe as claimed in claim 3, wherein the at least one cutout is shaped such that at least areas of the cutout run substantially parallel to one another.

6. The brake shoe as claimed in one of claim 3, wherein a ratio of a thickness of the fastening area with respect to a width of the web is in a range from approximately 0.05 to 1.

7. The brake shoe of claim 6, wherein the ratio is in a range of approximately 0.1 to 0.5.

8. The brake shoe as claimed in claim 3, wherein a ratio of the thickness of the fastening area with respect to a length of the web is in a range from 0.05 to 1.

9. The brake shoe as claimed in claim 8, wherein the ratio of the thickness of the fastening area with respect to the length of the web is in a range of approximately 0.1 to 0.5.

10. The brake shoe as claimed in claim 9, wherein the ratio of the thickness of the fastening area with respect to the length of the web is in a range of approximately 0.15 to 0.35.

11. The brake shoe as claimed in claim 1, wherein the web is one of a multiplicity of webs that are arranged distributed equally around a circumference of the opening.

12. The brake shoe as claimed in claim 3, wherein the web forms an angle with the lining carrier which is within the range of between 10 and 50°.

13. The brake shoe as claimed in claim 1, wherein the fastening area is one of a multiplicity of fastening areas which are arranged in a row.

14. The brake shoe as claimed in claim 1, wherein the fastener is a mechanical fastener.

15. The brake shoe as claimed in claim 14, wherein the mechanical fastener is a rivet.

16. A method for producing a rivet connection between at least two components, comprising:
   providing a rivet element;
   providing at least two components, wherein a lining carrier is provided as the first component and a brake lining is provided as the second component, wherein the lining carrier has an arrangement face for arranging the brake lining;
   shaping a fastening area of the lining carrier such that when the brake lining is fastened on the arrangement face the attachment area is at least partially restored to an original shape, wherein the fastening area is configured to be placed in engagement with the rivet element for fastening the brake lining; and
   fastening the lining carrier and brake lining to the rivet element, wherein the fastening area is offset with respect to the arrangement face of the lining carrier in a direction away from the brake lining.

* * * * *